No. 611,708. Patented Oct. 4, 1898.
C. E. PIERCE.
HANDLE FOR JARS.
(Application filed Nov. 3, 1897.)
(No Model.)

WITNESSES:
Rollin Abell
A. D. Harrison

INVENTOR
C. E. Pierce
by Wright Brown Quinby
Attys.

UNITED STATES PATENT OFFICE.

CHARLES E. PIERCE, OF CAMBRIDGE, MASSACHUSETTS.

HANDLE FOR JARS.

SPECIFICATION forming part of Letters Patent No. 611,708, dated October 4, 1898.

Application filed November 3, 1897. Serial No. 657,281. (No model.)

*To all whom it may concern:*

Be it known that I, CHARLES E. PIERCE, of Cambridge, in the county of Middlesex and State of Massachusetts, have invented certain new and useful Improvements in Handles for Jars, of which the following is a specification.

This invention has for its object to provide an improved handle for cream jars or bottles and the like of simple and cheap construction and capable of being easily attached and removed.

The invention consists in the improvements which I shall now proceed to describe and claim with the aid of the accompanying drawings, forming a part of this application.

Figure 1:
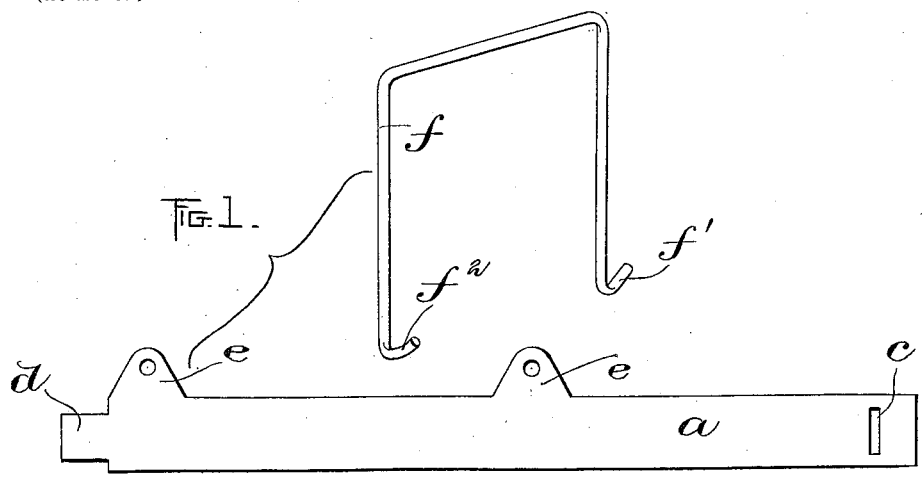
Figure 2:
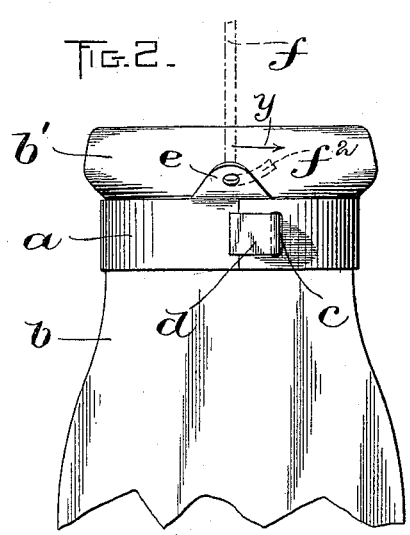
Figure 3:
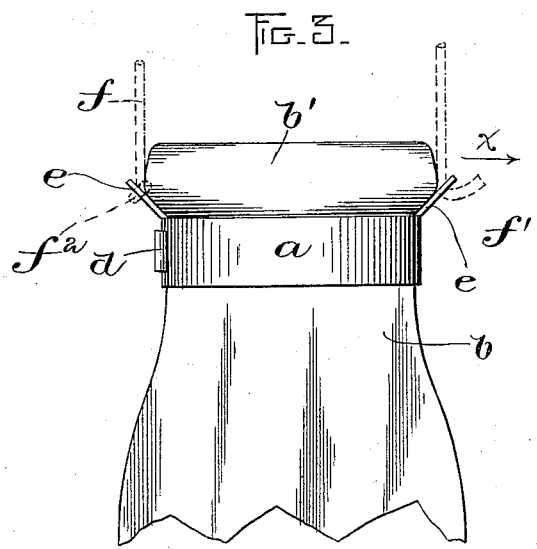
Figure 4:
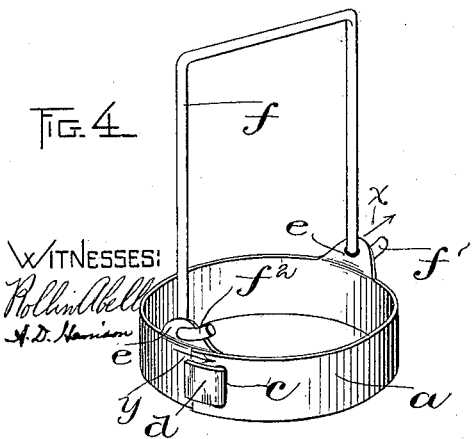
Figure 5:
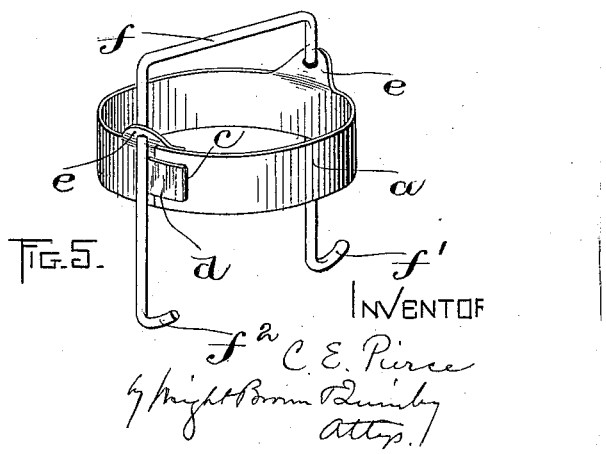

Figure 1 represents a perspective view of the two parts of a jar-handle constructed in accordance with my invention. Figs. 2 and 3 represent two views in elevation, showing the neck-encircling band in place on the neck of a jar. Fig. 4 represents a perspective view of the band and bail attached to each other. Fig. 5 represents a similar view to Fig. 4, showing the bail depressed.

The same reference characters indicate the same parts in all the figures.

Referring to the drawings, $a$ designates a sheet-metal band adapted to encircle the neck of a jar or bottle $b$. One end of the band is provided with a locking-slot which receives a tongue $d$, formed on the other end, the tongue being inserted in the slot when the band is bent around the neck of the jar and then turned back, as in Fig. 2, to lock the band securely in position. The bead $b'$ around the mouth of the jar serves to prevent said band from slipping off.

On the upper edge of the band $a$ are formed ears $e\ e$, which are perforated or formed with eyes to receive the wire bail $f$, the ears being bent outwardly when the band is applied to the jar. One end of the bail has a hook $f'$, standing in the plane of the bail, while the other end has a hook $f^2$, standing at right angles to said plane. When the bail is to be attached to the band $a$, the hook $f'$ is first inserted in one of the ears $e$ by a movement in the direction of the arrow $x$, and then the hook $f^2$ is inserted by a movement in the direction of the arrow $y$, or the latter insertion may be made somewhat more easily by first turning the bail over until the hook $f^2$ points downwardly. The removal of the bail is accomplished by performing the foregoing movements in a reverse manner. When the band and bail have been thus attached to the jar, the latter may be safely lifted and transported by grasping the bail $f$ and lifting the jar.

When not in use, the bail may be pushed down through the ears $e\ e$, as shown in Fig. 5, until the cross-piece rests across the mouth of the jar.

The device can be supplied flat, as shown in Fig. 1, and then formed and applied by the user or by the dealer who fills or supplies jars for customers, different sizes being preferably used for the different sizes of jars.

Where there is a slight variation in the circumference of the necks on different jars, the tongue $d$ may be made of sufficient length to furnish a certain degree of adjustability, or more than one slot $c$ may be provided for a like purpose.

Having thus explained the nature of my invention and described a way of constructing and using the same, although without having attempted to set forth all the ways in which it may be made or all the modes of its use, I declare that what I claim is—

1. A handle for jars and similar articles, comprising a flexible band adapted to encircle the neck of the jar and having locking members at its ends to lock said ends together, and a bail detachably secured to said band and adapted to move vertically relatively thereto.

2. A handle for jars and similar articles, comprising a bail, and a flexible sheet-metal band adapted to encircle the neck of the jar, the said band being formed at its ends with integral locking members to lock said ends together, and being formed on its upper edge with integral perforated ears adapted to be bent outward and to engage the bail.

3. A handle for jars and similar articles, comprising a collar adapted to encircle the neck of the jar and having eyes formed to receive a bail, and a detachable bail having hooks at its lower ends, one of which stands in the plane of the bail and the other of which stands at right angles to said bail, for the purpose set forth.

4. A handle for jars and similar articles, comprising a neck-encircling band formed of a single piece of flat sheet metal and having integral locking members at its ends and integral perforated ears adapted to be bent outward and to engage a bail, and a bail formed of wire bent to the desired form and having hooks at its ends to engage said ears.

5. A handle for jars and similar articles, comprising a flexible neck-encircling band having locking members for locking its ends together, and formed with eyes to receive a bail, and a bail having parallel vertical side portions passing through said eyes and adapted to be slid up and down therethrough, the said bail having provisions at its ends whereby it may be readily detached from and attached to said band.

In testimony whereof I have signed my name to this specification, in the presence of two subscribing witnesses, this 12th day of October, A. D. 1897.

CHARLES E. PIERCE.

Witnesses:
HORACE BROWN,
A. D. HARRISON.